(12) United States Patent
Shu et al.

(10) Patent No.: US 12,430,863 B2
(45) Date of Patent: Sep. 30, 2025

(54) DEFORMABLE NEURAL RADIANCE FIELD FOR EDITING FACIAL POSE AND FACIAL EXPRESSION IN NEURAL 3D SCENES

(71) Applicant: Adobe Inc., San Jose, CA (US)

(72) Inventors: Zhixin Shu, San Jose, CA (US); Zexiang Xu, San Jose, CA (US); Shahrukh Athar, Stony Brook, NY (US); Kalyan Sunkavalli, San Jose, CA (US); Elya Shechtman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 324 days.

(21) Appl. No.: 17/892,097

(22) Filed: Aug. 21, 2022

(65) Prior Publication Data

US 2024/0062495 A1 Feb. 22, 2024

(51) Int. Cl.
*G06T 19/20* (2011.01)
*G06T 17/00* (2006.01)

(52) U.S. Cl.
CPC .............. *G06T 19/20* (2013.01); *G06T 17/00* (2013.01); *G06T 2200/08* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 2008/0025569 A1* | 1/2008 | Gordon | G06V 40/161 382/103 |
| 2014/0043329 A1* | 2/2014 | Wang | G06T 17/20 345/420 |
| 2014/0156398 A1* | 6/2014 | Li | G06Q 30/0269 705/14.66 |
| 2021/0279956 A1* | 9/2021 | Chandran | G06T 17/20 |
| 2022/0028150 A1* | 1/2022 | Soulvie | G06T 13/20 |

(Continued)

OTHER PUBLICATIONS

Yao et al. ("Learning an Animatable Detailed 3D Face Model from In-The-Wild Images" Aug. 2021, ACM Trans. Graph., vol. 40, No. 4, Article 88). (Year: 2021).*

(Continued)

*Primary Examiner* — David H Chu
(74) *Attorney, Agent, or Firm* — Kilpatrick Townsend & Stockton LLP

(57) ABSTRACT

A scene modeling system receives a video including a plurality of frames corresponding to views of an object and a request to display an editable three-dimensional (3D) scene that corresponds to a particular frame of the plurality of frames. The scene modeling system applies a scene representation model to the particular frame, and includes a deformation model configured to generate, for each pixel of the particular frame based on a pose and an expression of the object, a deformation point using a 3D morphable model (3DMM) guided deformation field. The scene representation model includes a color model configured to determine, for the deformation point, color and volume density values. The scene modeling system receives a modification to one or more of the pose or the expression of the object including a modification to a location of the deformation point and renders an updated video based on the received modification.

17 Claims, 8 Drawing Sheets

(56) References Cited

U.S. PATENT DOCUMENTS

| | | | |
|---|---|---|---|
| 2022/0245911 A1* | 8/2022 | Hu | G06T 19/20 |
| 2023/0115531 A1* | 4/2023 | Zohar | G06T 19/006 |
| | | | 345/418 |
| 2023/0130281 A1* | 4/2023 | Brown | G06N 3/04 |
| | | | 345/420 |
| 2023/0196593 A1* | 6/2023 | Raghoebardajal | G06T 7/251 |
| | | | 345/419 |
| 2024/0005590 A1* | 1/2024 | Martin Brualla | G06T 15/04 |
| 2024/0078773 A1* | 3/2024 | Kim | G06T 15/08 |
| 2024/0095999 A1* | 3/2024 | Szabo | G06V 10/44 |
| 2025/0037366 A1* | 1/2025 | Zoss | G06T 17/00 |

OTHER PUBLICATIONS

Blanz et al., A Morphable Model for the Synthesis of 3D Faces, SIGGRAPH '99, Proceedings of the 26th Annual Conference on Computer Graphics and Interactive Techniques, Jul. 1999, 8 pages.

Feng et al., Learning an Animatable Detailed 3D Face Model from In-the-wild Images, ACM Transactions on Graphics, vol. 40, Issue 4, Aug. 2021, pp. 1-13.

Gafni et al., Dynamic Neural Radiance Fields for Monocular 4D Facial Avatar Reconstruction, Available online at https://openaccess.thecvf.com/content/CVPR2021/papers/Gafni_Dynamic_Neural_Radiance_Fields_for_Monocular_4D_Facial_Avatar_Reconstruction_CVPR_2021_paper.pdf, 2021, pp. 8649-8658.

Guo et al., Towards Fast, Accurate and Stable 3D Dense Face Alignment, In Proceedings of the European Conference on Computer Vision (ECCV), Aug. 2020, 21 pages.

Li et al., Learning a Model of Facial Shape and Expression from 4D Scans, ACM Transactions on Graphics, vol. 36, Issue 6, Nov. 2017, pp. 1-17.

Mildenhall et al., NeRF: Representing Scenes as Neural Radiance Fields for View Synthesis, European Conference on Computer Vision, Aug. 3, 2020, pp. 1-25.

Park et al., HyperNeRF: A Higher-Dimensional Representation for Topologically Varying Neural Radiance Fields, ACM Transactions on Graphics, vol. 40, Issue 6, Dec. 2021, pp. 1-12.

Park et al., Nerfies: Deformable Neural Radiance Fields, Proceedings of the IEEE/CVF International Conference on Computer Vision (ICCV), 2021, pp. 5865-5874.

Pumarola et al., D-NeRF: Neural Radiance Fields for Dynamic Scenes, Available online at https://openaccess.thecvf.com/content/CVPR2021/papers/Pumarola_D-NeRF_Neural_Radiance_Fields_for_Dynamic_Scenes_CVPR_2021_paper.pdf, 2021, pp. 10318-10327.

* cited by examiner

DEFORMABLE NEURAL RADIANCE FIELD FOR EDITING FACIAL POSE AND FACIAL EXPRESSION IN NEURAL 3D SCENES

TECHNICAL FIELD

This disclosure generally relates to machine learning techniques for three-dimensional (3D) scene modeling. More specifically, but not by way of limitation, this disclosure relates to machine learning models for modeling for 3D scenes including deformable objects.

BACKGROUND

Conventional neural radiance field (NeRF) networks can generate views of a 3D scene from a set of 2D images. In particular, NeRF networks can generate a view of a 3D scene given any view coordinates (e.g. an input spatial location and viewing direction).

SUMMARY

The present disclosure describes techniques for generating, based on an input video and using a deformable NeRF scene representation model, a 3D scene including an editable object. A scene modeling system receives a video including a plurality of frames corresponding to a plurality of views of an object and a request to display an editable three-dimensional (3D) scene that includes the object and that corresponds to a particular frame of the plurality of frames. The scene modeling system generates the editable 3D scene by applying a scene representation model to the particular frame. The scene representation model includes a deformation model configured to generate a 3D morphable model (3DMM) guided deformation field, the 3DMM-guided deformation field being a sum of a 3DMM deformation field and a residual predicted by the deformation model and generate, for each pixel of the input frame and based on a pose and an expression of the object, a deformation point using the 3D morphable model (3DMM) guided deformation field. The scene representation model includes a color model configured to determine, for the deformation point and using a volume rendering process, a color value and a volume density value. The scene modeling system receives a modification to one or more of the pose or the expression of the object including at least a modification to a location of the deformation point. The scene modeling system renders an updated editable 3D scene based on the received modification. The scene modeling system generates an updated modified video including an updated frame to replace the particular frame, the updated frame generated based on the updated editable 3D scene.

Various embodiments are described herein, including methods, systems, non-transitory computer-readable storage media storing programs, code, or instructions executable by one or more processing devices, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
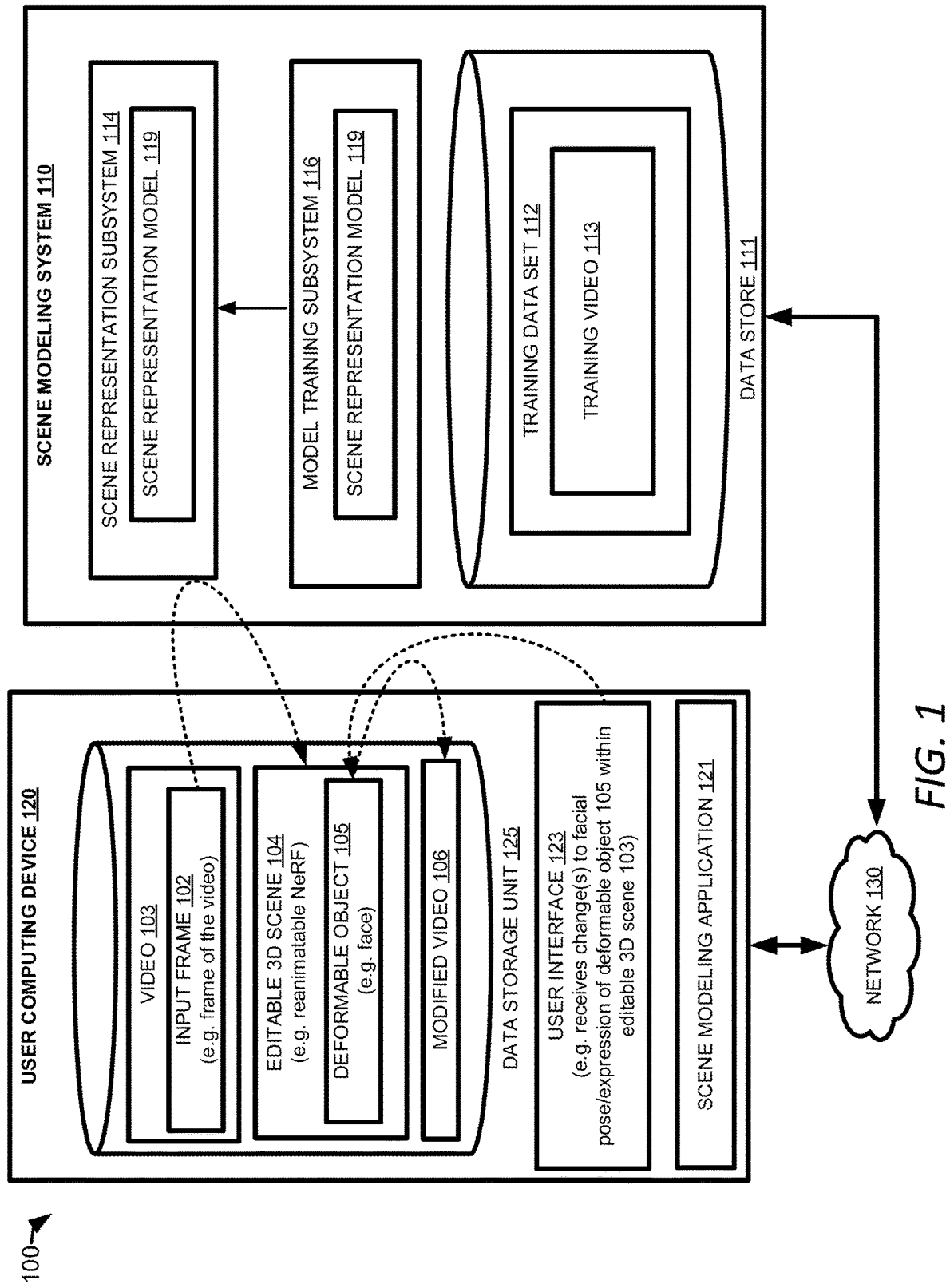
FIG. 1 depicts an example of a computing environment for generating, based on an input video and using a scene representation model, a deformable three-dimensional scene, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

Certain embodiments described herein address the limitations of conventional scene modeling systems by providing a machine learning model that uses a deformation model and color model to render an editable 3D scene, wherein the editable 3D scene can be used for modifying online computing environments or other systems. For example, the editable 3D scene generated from an input video can include a deformable object which can be edited by a user in an online computing environment to generate an edited video. A scene modeling system is a network-based computing system including network-connected servers configured to offer a service allowing end users to interact with the servers using network-connected computing devices to upload a video of an object (e.g. a person including a face) and to request an editable 3D scene (e.g. the object, deformable within a 3D environment) which can be displayed via computing devices from multiple camera views. The network-connected server may offer services, for example, via a website, mobile application, or other means. The users' network-connected computing devices may be personal computers, mobile devices, tables, and the like. In some instances, end users can change a pose of the object in the editable 3D scene, such as by inputting one or more deformations to change a facial pose and/or a facial expression.

In response to the change, the scene modeling system can update the input video to include the changed pose or facial expression of the object, which is a novel pose/expression not present in the original input video. A facial pose refers to an orientation of the face. In addition to changing the pose of the object in the editable 3D scene and/or the expression of the object in the editable scene, in some instances, end users can change a camera view of the editable 3D scene and the input video can be further updated based on the editable 3D scene to include the changed camera view.

Conventional scene modeling systems generate a NeRF model of a 3D scene and enable only limited editing of the 3D scene. Conventional NeRF models are generally designed for static scenes and offer no control over objects within the scene and only enable changes to a camera view and/or camera position within the 3D scene. Although some conventional NeRF models enable object-specific deformations, such as facial pose or facial expression control for face objects, such NeRF models estimate deformations that are conditioned on learned deformation codes that are arbitrary and lack specific physical or semantic meaning, and therefore are not controllable in an intuitive manner. Further, deformations in conventional NeRF models are learned in a latent space and therefore cannot be explicitly controlled. Paramaterizing a deformation field using a 3DMM head-pose and facial expression space is a way to add control to head-pose and facial expressions. However, such naive implementation of a deformation field leads to artefacts during the reanimation due to the loss of rigidity and incorrect modeling of facial expressions. Further, while some conventional NeRF models may enable modeling of head poses, they are unable to perform novel view synthesis as they focus on the face region but neglect the geometry and appearance of the 3D scene as a whole. For example, conventional NeRF models may assume a static background and fixed camera position and camera view angle.

Certain embodiments described herein improve the an accuracy of conventional NeRF-based models used in scene modeling systems by, for example, using a 3D morphable face model as guidance for learning controllable deformation of a deformable NeRF, which results in effective learning of object-specific deformation to enable editing of a 3D scene. The embodiments described herein provide deformation control that explicitly disentangles and controls facial appearance of faces depicted within a 3D scene based on camera viewpoint, head pose, and facial expression. Accordingly, the embodiments described herein enable full parametrized control over head pose and facial expression while also enabling control of camera position and camera view angle. Specifically, the embodiments described herein leverage a 3DMM to generate a coarse deformation field which is then refined by corrective residual predicted by a multi-layer perceptron ("MLP") to account for non-rigid dynamics, hair and accessories, which improves an accuracy of video editing over conventional NeRF models by accurately capturing such details of the human head. Beyond providing a controllable deformation field, the embodiments described herein enable generate novel head poses and facial expressions within videos that were not observed in an input video used to train the model.

The following non-limiting example is provided to introduce certain embodiments. In this example, an scene modeling system that implements a scene representation model receives input video including multiple frames. For example, the frames of the video are images captured of an object or set of objects from multiple camera views over time. The object could be a person including views of a face of the person. The scene modeling system receives the input video from a user computing device, such as a mobile device, a tablet device, a laptop computer, digital camera, or other user computing device, via a network. For example, a user of the user computing device captures video of the person from multiple locations and/or camera view angles.

Continuing with this example, the scene modeling system applies a scene representation model to a frame of the input video to generate a 3D scene. In certain examples, a user requests to make one or more edits to an object within one or more frames of the video. For example, the user may request to change a pose or expression of a face of the user depicted in the input video at a particular frame. For example, the 3D scene is represented using a NeRF model and, for each frame, can be viewed from multiple views. The view is defined by view coordinates, which may represent a camera location within the 3D scene and/or a camera viewing angle. In some instances, the view is associated with predefined view coordinates. For example, a default view may be a frontal view at a location 10 meters from the person depicted in the video. The scene representation model is configured to generate a deformation point for each pixel of the frame of the input video using a deformation model. The scene representation model is also configured to determine, using a color model and for each pixel using a volume rendering process, a color value. For example, the color value is a radiance value and is represented by red-green-blue (RGB) color value. The volume density value is a probability of the ray, projected through the pixel, terminating at the location corresponding to the deformation point. The deformation point can be used to deform an object in the video. As an example, the deformation point can be used to deform the face of the user by changing an expression or a pose, or performing other object-specific deformations. Deforming a face object can include changing a pose and/or an expression of the face using one or more deformation points generated by the deformation model. For example, the deformation points can act as control points for deforming, moving (e.g. rotating) or otherwise editing a 3D mesh model of the face. The scene representation model can use a ray marching technique to generate pixel values (e.g. color and volume density) for an output image defining a view of the edited 3D scene. The ray marching technique includes selecting, for each pixel of the output image, shading points along a ray projected into the edited 3D scene which are used to perform the volume rendering process. In some instances, a deformation point along the ray is one of the sampled shading points. A color and volume density value is determined for the shading points along the ray and then a final color value for pixel is determined based on features (color value, volume density) of the shading points along the ray.

Other object-specific deformation operations can be performed using deformation points according to a type of object. In certain examples, the scene modeling system displays the 3D scene representing the frame of the input video, including deformation points generated for the depicted object, via the user interface of the user computing device. For example, the object is a face and deformation points act as control points for moving and/or deforming a 3D face mesh and scene modeling system receives an input moving one or more deformation points to modify an expression of the face object. The user can drag individual deformation points to manually modify an expression of the face or can select a semantic label which causes one or more deformation points to move into a predefined configuration associated with the semantic label. The semantic label could be associated with a happy expression, a sad expression, a surprised expression, an angry expression, or other semantic label. In another example, the scene modeling system receives an input image, determines an expression of the input image, and automatically moves one or more deformation points to match the expression of the input image. In certain embodiments, in addition to modifying the object using the deformation points, the scene modeling system receives a modification to a camera position and/or camera view angle. For example, the scene modeling system receives a request to change an expression of the face of the depicted person and to zoom the camera view in the frame of the input video corresponding to the 3D scene.

Continuing with this example, the scene modeling system generates a modified video based on the object that was modified using the deformation points. For example, the scene modeling system changes the pose or expression of the face of the person depicted in the 3D scene using the deformation points in the frame of the input video upon which the 3D scene is based. The user may similarly use the scene modeling system to apply the scene representation model to other scenes in the video. The scene modeling system transmits the modified video to the user computing device from which the scene modeling system received the request to edit the input video.

Example Operating Environment for Generating, Based on an Input Video and Using a Scene Representation Model, a Three-Dimensional Scene Including a Deformable Object Referring now to the drawings, FIG. 1 depicts an example of a computing environment 100 for generating, based on a video 103 and using a scene representation model 119, an editable 3D scene 104 including a deformable object 105. For example, the deformable object 105 is a face of a person depicted in the editable 3D scene 104 or other object within the editable 3D scene 104. The computing environment 100 includes scene modeling system 110, which can include one or more processing devices that execute a scene representation subsystem 114 and a model training subsystem 116. In certain embodiments, the scene modeling system 110 is a network server or other computing device connected to a network 130. The scene representation subsystem 114 applies a scene representation model 119 to the video 103 received from a user computing device 120 (or other client system) to generate an editable 3D scene 104. In some instances, the user computing device 120 displays the editable 3D scene 104. For example, applying the scene representation model 119 includes generating, for each pixel of a frame of the video, a deformation point and determining, for each deformation point and using a volume rendering process, a color value and a volume density value. Further details about the point cloud generation model and the point-based neural rendering model are described in FIG. 2 and in FIG. 3.

The one or more processing devices of the scene modeling system 110 can further execute a model training subsystem 116 for training the scene representation model 119 that is used for generating the editable 3D scene 104. The scene modeling system 110 transmits the editable 3D scene 104 to the user computing device 120 via the network 130 and the user computing device 120 stores the editable 3D scene 104 in the data storage unit 125. The scene modeling system 110 further includes a data store 111 for storing data used in the generation of the editable 3D scene 104, such as the training data set 112, which includes training video 113.

The scene representation subsystem 114 and the model training subsystem 116 may be implemented using software (e.g., code, instructions, program) executed by one or more processing devices (e.g., processors, cores), hardware, or combinations thereof. The software may be stored on a non-transitory storage medium (e.g., on a memory component). The computing environment 100 depicted in FIG. 1 is merely an example and is not intended to unduly limit the scope of claimed embodiments. One of the ordinary skill in the art would recognize many possible variations, alternatives, and modifications. For example, in some implementations, the scene modeling system 110 can be implemented using more or fewer systems or subsystems than those shown in FIG. 1, may combine two or more subsystems, or may have a different configuration or arrangement of the systems or subsystems.

The scene representation subsystem 114 is configured to receive or otherwise access a video 103. The video 103, in some instances, is captured by the user computing device 120 and provides, within individual frames of the video 103, different views of an object. For example, a view of an object corresponds to view coordinates indicating a camera position and a view angle of the camera. In some instances, the video 103 is provided to the scene representation subsystem 114 by the user computing device 120 executing a scene modeling application 121. In certain examples, a user uploads the video 103 and the user computing device 120 receives the video 103 and transmits, via the network 130, the video 103 to the scene representation subsystem 114. In certain examples, the user uploads or otherwise selects the video 103 via a user interface 123 of the user computing device 120 (e.g., using the scene modeling application 121). In some instances, the scene modeling application 121 receives and communicates the selection of the video 103 to the scene representation subsystem 114 via the network 130. In some instances, the scene modeling system 110 provides, for download by the user computing device 120, the scene modeling application 121. In some instances, the scene modeling application 121 displays a request to upload or otherwise select a set an input video 103, which could read "Please upload/select video," or the like. The image modeling application 121 receives a selection of the video 103.

In some instances, the scene representation subsystem 114 receives the video 103 corresponding to a set of views of the object and a request to display an editable 3D scene 104 that includes a deformable object 105, where the deformable object 105 is at least part of the object depicted in the editable 3D scene 104 (e.g. a face of a person depicted in the editable 3D scene 104).

To generate the editable 3D scene 104, the scene representation subsystem 114 employs a scene representation model 119. Additional details about generating the editable 3D scene 104 by applying a scene representation model 119 are provided below with respect to FIG. 2, FIG. 3, and FIG. 4. Additional details about deformation field for use in the scene representation model are provided below with respect to FIG. 5. In certain examples, generating the editable 3D scene 104 includes generating, using a deformation model and for each pixel of a frame of the video, a deformation point and determining, using a color model, for each deformation point and using a volume rendering process, a color value and a volume density value. The scene modeling application 121 enables editing of the editable 3D scene 104 by enabling control of head pose and/or facial expression of the deformable object 105. For example, the scene modeling application 121 render a novel head pose of the deformable object 105 responsive to receiving an input. For example, the editable 3D scene 104 displays the deformable object 105 (e.g. the head and face of the person depicted in the video 103) oriented straight at the viewer and the user requests to change the pose so that the deformable object 105 is rotated fifteen degrees to one side. For example, the scene modeling application 121 renders a novel facial expression of the deformable object 105 responsive to receiving an input. A change to pose can include a change to one or more of a yaw, a pitch, or a roll, which results in displacement of deformation points via rotation of the deformable object 105. For example, the editable 3D scene 104 displays the deformable object 105 and one or more user interface objects that enable modification to a facial expression. For example, the user may select a semantic category (e.g. surprised, angry, happy, afraid, amused, etc.) for the facial expression and the scene modeling application 121 deforms the deformable object 105, which results in displacement of one or more deformation points of the deformation field generated by the scene representation model 119 to correspond to the semantic category selected by the user. In some instances, the user may select values across one or more dimensions (e.g. afraid to content, angry to happy, tired to energetic, etc.) to define a facial expression and the scene modeling application 121 deforms the deformable object 105 using one or more deformation points of the deformation field generated by the scene representation model 119 to correspond to the facial expression specified by the user via the user interface 123 inputs. The scene modeling application 121 enables editing of the editable 3D scene 104 by rendering novel views of the editable 3D scene 104 using a volume rendering process, responsive to one or more inputs received via the user interface 123. In some instances, the scene modeling application 121 renders a novel view of the editable 3D scene 104 responsive to receiving an input of a view coordinate. For example, the view is represented by a view coordinate that defines a position and orientation of a camera within the editable 3D scene 104.

Figure 6:
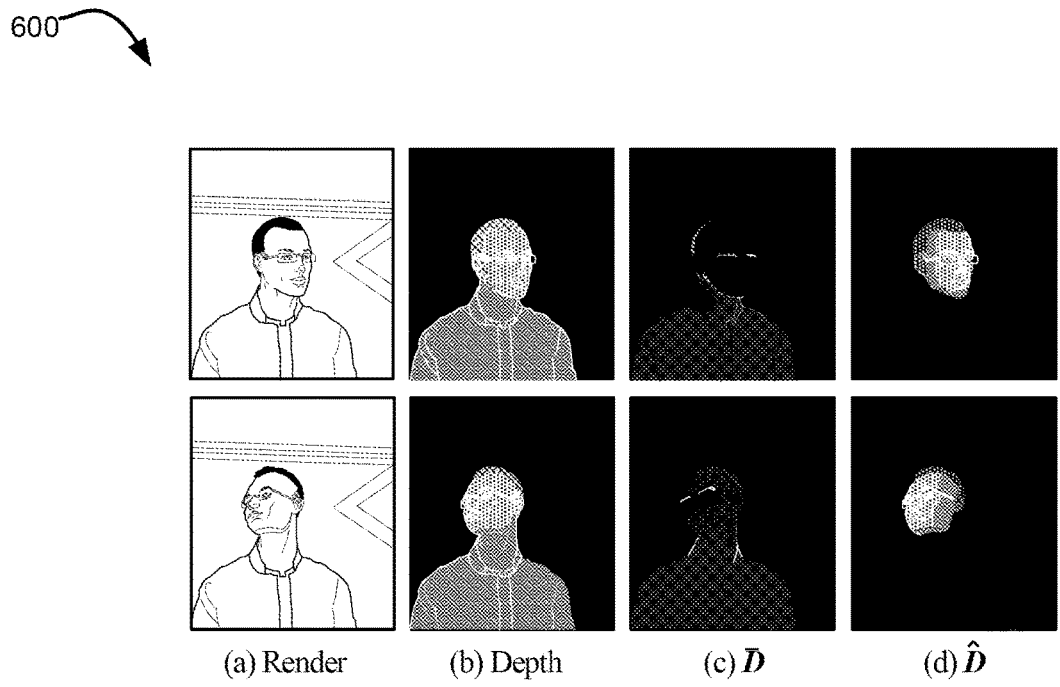
FIG. 6 depicts an illustration of example deformation fields output by the scene representation model of FIG. 2.

The scene modeling application 129 generates a modified video 103 based on the modified editable 3D scene 104. For example, the editable 3D scene 104, generated based on a frame of the video 103, is modified to change a pose or expression of the deformable object 105 and/or to change a camera view (e.g. location and view angle). In certain embodiments, the scene representation subsystem 114 and/or the scene modeling application 121 generates the modified video 103 by editing the frame of the video 103 in accordance with the modified editable 3D scene 104. Example editing operations performed on editable 3D scenes 104 generated using the scene representation model 119 are illustrated in FIG. 6.

The scene modeling system 110 trains the scene representation model 119 using the model training subsystem 116. The model training subsystem 116 builds and trains the scene representation model 119 for a scene (e.g. including an object) The model training subsystem 116, using a training data set 112 (e.g. a training video 103 of different views of an object in the scene), trains the scene representation model 119. In various examples, the model training subsystem 116 can be implemented as one or more of program code, program code executed by processing hardware (e.g., a programmable logic array, a field-programmable gate array, etc.), firmware, or some combination thereof.

Example of an Image Modification Model

Figure 2:
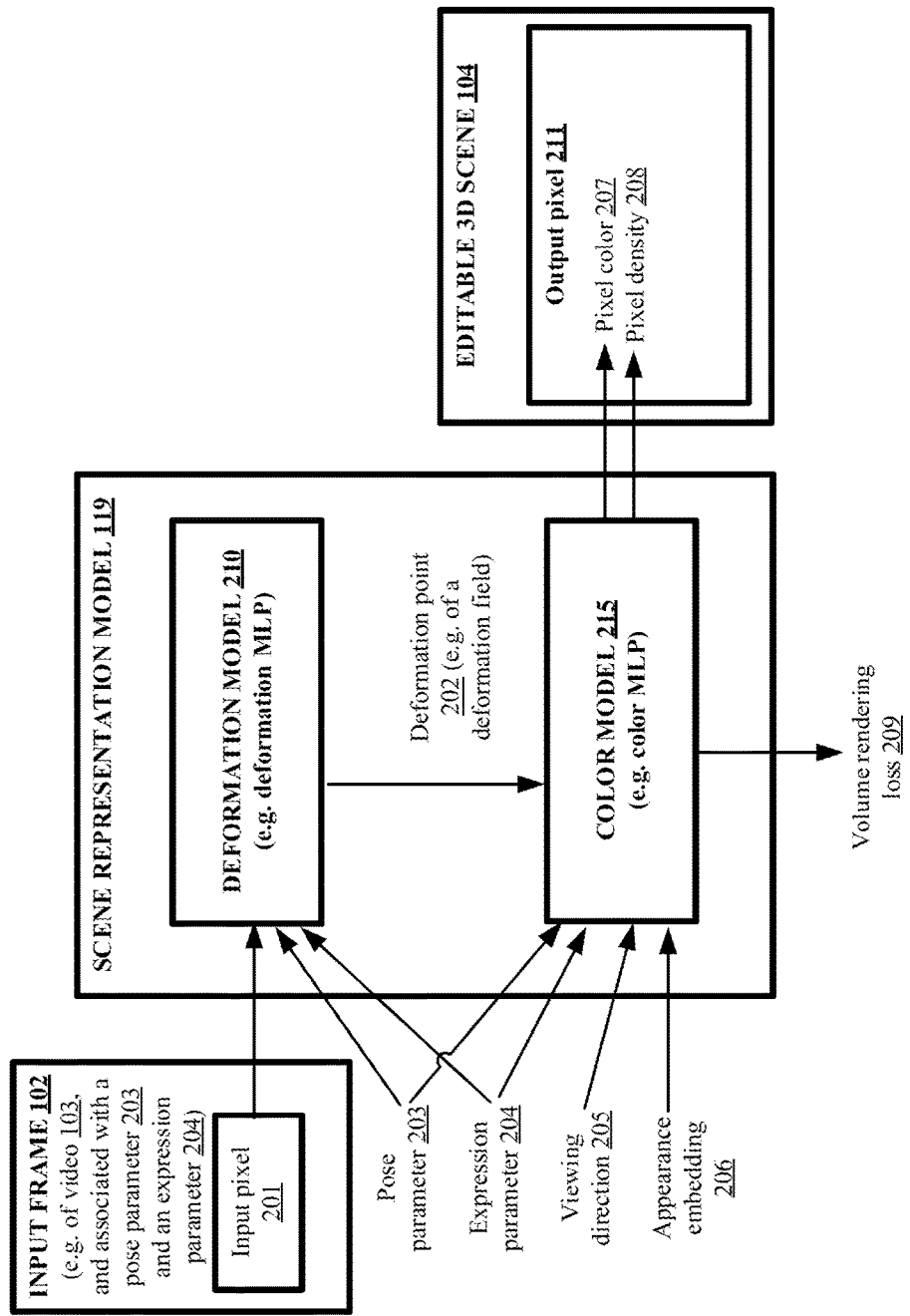
FIG. 2 depicts an example illustration of a scene representation model for use in the computing environment of FIG. 1, according to certain embodiments disclosed herein.

FIG. 2 depicts an illustration of a scene representation model 119 for use in certain embodiments described herein, for example as described FIGS. 1 and 3-5. As depicted in FIG. 2, the scene representation model 119 includes a deformation model 210 and a color model 215. Additional details about the scene representation model 119 are described in FIG. 3 and an example process for applying the scene representation model 119 to input images 102 is described in FIG. 4. In certain examples, as depicted in FIG. 2, the scene representation model 119 receives an input frame 102 of a video 103, for example, a video 103 including multiple frames including different views of an object. An example of an object is a person. Example views include a frontal view, a view from above, one or more side views, a view from behind, or other view of the object.

Figure 5:
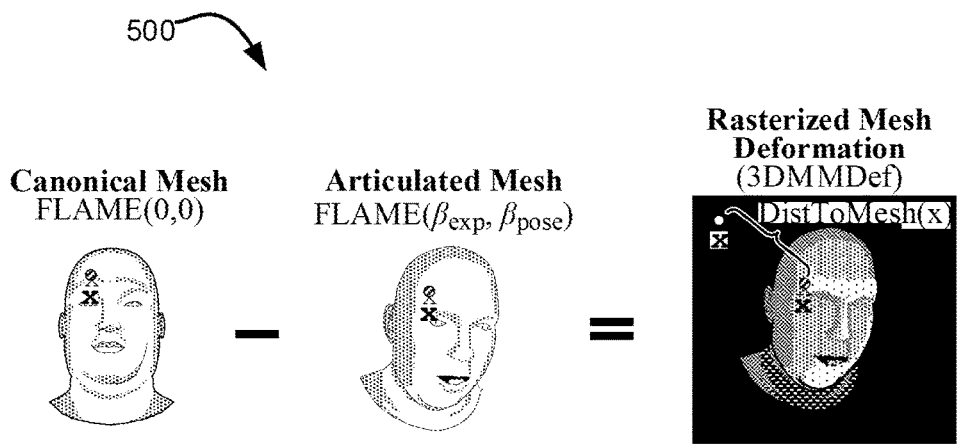
FIG. 5 depicts an illustration of a deformation field for use in the scene representation model of FIG. 2, according to certain embodiments disclosed herein.

In a first stage, the scene representation model 119 generates, using the deformation model 210, a deformation field based on the input frame 102 on a pixel by pixel basis. In certain embodiments, the deformation model 210 is a MLP. The deformation model 210 is configured to generate, for each pixel (e.g. input pixel 201) of the input frame 102, a deformation point 202. In certain embodiments, a deformation point 202 in the deformation field is assigned a location within the 3D scene. In certain embodiments, for each input frame 102 of the video 103, the deformation model 210 extracts an expression parameter 204 (e.g. $\beta_{i,exp}$) and a pose parameter 203 (e.g. $\beta_{i,pose}$) of the input frame 102, which can be expressed as $\{\beta_{i,exp}, \beta_{i,pose}\}$. In some instances, the deformation model 210 extracts the expression and pose parameters 204, 203 using detailed expression capture and animation ("DECA") and landmark fitting. DECA reconstructs a detailed facial geometry from a single input image. In landmark fitting, particular landmarks (e.g. eyes, teeth, nose, chin, etc.) of an object (e.g. a face) are annotated and used to help define a pose and/or expression of the object. The deformation model 210, for each input pixel 201 of the pixels defining the input frame 102, projects a ray through the input pixel 201, p, and deforms each point on the ray, x, to a position in a canonical space, $x_{can}=(x', y', z')$. The deformation model 210 uses a three dimensional morphable face model ("3DMM") to paramaterize the canonical space and any deviations from the canonical space. In certain examples, the canonical space is defined as a space in which the head object depicted in the input frame 102 has a zero (e.g. default) head pose and a neutral facial expression. For example, a neutral face expression is a predefined facial expression, for example, a placid expression, a content expression, or other predefined expression associated with a particular geometrical configuration of facial features. An illustration of the canonical space is depicted in FIG. 5.

Because a 3DMM is only defined accurately for a subset of points on a head object, 3DMM fitting is often not perfect and cannot model hair, glasses, or other accessories affixed to the head, and is undefined for points in the rest of the 3D space. Therefore a deformation MLP, $D_i: x \rightarrow x_{can}$ is used to perform the transformation to the canonical space, but may give rise to artefacts due to the inability of the deformation model 210 to maintain a rigidity of the head object and an inability of the deformation MLP to model facial expressions correctly. To ensure that the deformation model 210 is able to handle both rigid deformations due to head-pose changes and non-rigid deformations due to changes in facial expressions, the deformation model 210, in some embodiments, uses a deformation field prior (e.g. a probability distribution) derived using the 3DMM. The deformation model 210 can determine, for the expression and pose parameters 204, 203, $\{\beta_{i,exp}, \beta_{i,pose}\}$ associated with the input frame 102, a value of the 3DMM deformation field at any point $x=(x, y, z)$, as:

$$3DMMDef(x, \beta_{exp}, \beta_{pose}) = \frac{3DMMDef(\hat{x}, \beta_{exp}, \beta_{pose})}{\exp(DistToMesh(x))}, \quad (1)$$

where 3DMMDef(x) is the value of the 3DMM deformation field, where $\hat{x}=(\hat{x}, \hat{y}, \hat{z})$ is a closest point to the point $x=(x, y, z)$ on the mesh, where the distance to the mesh, DistToMesh=$\|x-\hat{x}\|$ is the distance between x and $\hat{x}$. The 3DMM deformation of any point on the mesh, $\hat{x}$, is given by the difference between the position of the point in the canonical space (e.g. when the mesh had a zero head object pose and a neutral facial expression) and its current articulation, which can be represented as:

$$3\text{DMMDef}(\hat{x},\beta_{exp},\beta_{pose})=\hat{x}_{FLAME(0,0)}-\hat{x}_{FLAME(\beta_{exp},\beta_{pose})} \quad (2)$$

Where $\hat{x}_{FLAME(0,0)}$ is the position of the point x in the canonical space and $\hat{x}_{FLAME(\beta_{exp},\beta_{pose})}$ is the position of the point with facial expression and pose parameters 204, 203, $\{\beta_{i,exp}, \beta_{i,pose}\}$. Therefore, the 3DMM-guided deformation field can be define as a sum of the 3DMM deformation field and the residual predicted by the deformation model 210, D, as follows:

$$\hat{D}(x)=3\text{DMMDef}(x,\beta_{i,exp},\beta_{i,pose})+D(\gamma_a(x),\gamma_b(3\text{DMMDef}(x,\beta_{i,exp},\beta_{i,pose})),\omega_i) \ x_{can}=x+\hat{D}(x) \quad (3)$$

where $\hat{D}(x)$ is the value of the 3DMM-guided deformation field at the point x, $\{\gamma_a, \gamma_b\}$ is a positional embedding on x and 3DMMDef(x, . . . ) respectively and $\omega_i$ is a deformation embedding for the current frame (input frame 102). In some instances, $\omega_i$ models deformations that cannot be accounted for by head pose and facial expression changes. In some instances, conditioning the deformation model 210, D, directly on the facial expression and pose parameters 204, 203, $\{\beta_{i,exp}, \beta_{i,pose}\}$, leads to overfitting and poor generalization, due to high dimensionality of the code that makes it prone to overfitting. Accordingly, instead, in some embodiments, the deformation model 210, D, is conditioned on the 3DMM deformation of the point x, 3DMMDef(x, $\beta_{i,exp}$, $\beta_{i,pose}$). Because the 3DMM deformation of the point x, 3DMMDef(x, $\beta_{i,exp}$, $\beta_{i,pose}$) $\in \mathbb{R}^3$ is relatively low dimensional, it can, in some instances, be pushed into higher dimensions by adjusting a number of frequencies of its positional embedding, $\gamma_b$. For example, a predetermined number of frequencies (e.g. b=2) can be used for the 3DMM deformation. FIG. 6 includes an illustration of example outputs of the deformation model 210.

In a second stage, the scene representation model 119 determines, using the color model 215, a pixel color 207 and pixel density 208 for the deformation point 202 in accordance with a pose parameter 203, an expression parameter 204, a viewing direction 205, and an appearance embedding 206. For example, the pose parameter 203 represents a pose of the deformable object 105 (e.g. a head/face of the person depicted in the video). For example, the expression parameter 204 represents an expression of the deformable object 105 (e.g. a facial expression). For example, a viewing direction 205 represents view coordinates defining a view of the editable 3D scene 104 (e.g. defining camera location and camera orientation). For example, the appearance embedding 206 for the input frame 102 is a set of parameters input to the color model 215. The appearance embedding 206 is learned during the training phase and represents an appearance of the scene in a canonical, undeformed space. The appearance embedding 206, together with deformation parameters (e.g. a deformation embedding) are interpreted by the color MLP to output a desired deformed appearance output. In certain examples, generating an output image defining a view of the editable 3D scene 104 involves, for each pixel of an output 2D image corresponding to the view, conducting ray marching and inferring a red-green-blue ("RGB") color value for the pixel based on sampled shading points along the ray including the deformation point 202, each of the sampled shading points associated with a volume density value and a color value. The volume density for each shading point is a probability of the ray terminating at the location corresponding to the respective shading point.

In certain embodiments, the color model 215 models a neural radiance field (NeRF) is defined as the continuous function F that, given a position of a point in the 3D scene (e.g. the editable 3D scene 104), x, and a direction it is being viewed from, d (e.g. based on a camera position and camera view angle), outputs a color c=(r, g, b) and a density σ. The color model 215, in some embodiments, conditions the continuous function F on both expression and head-pose parameters 204, 203 and on features extracted from a penultimate level of the deformation model 210, D ($\gamma_a(x)$, $\gamma_b$ (3DMMDef(x, $\beta_{i,exp}$, $\beta_{i,pose}$)), $\omega_i$). In some instances, using the features extracted from the penultimate level of the deformation model 210 (e.g. deformation MLP), improves an overall quality of a render of the 3D editable scene 104. Once a point x has been deformed to its location in the canonical space, $x_{can}$ (e.g. the deformation point 202), the color model 215 calculates a color for the point x, as follows:

$$c(x,d),\sigma(x)=F(\gamma_c(x_{can}),\gamma_d(d),\sigma_i,D_{F_i}(x_{can}),\beta_{i,exp},\beta_{i,pose}) \quad (4)$$

Where d represents the viewing direction, where $\gamma_c$, $\gamma_d$ represents the positional embedding on the point in canonical space, $x_{can}$ and d, and $D_{F_i}(x_{can})$ represents features from the penultimate later of the deformation MLP D ($\gamma_a(x)$, $\gamma_b$ (3DMMDef(x, $\beta_{i,exp}$, $\beta_{i,pose}$)), $\omega_i$).

As depicted in FIG. 2, the scene representation model 119 is configured to determine a volume rendering loss 209. In certain examples, the volume rendering loss 209 is determined based on comparing a color value of pixel of a view of the 3D scene 104 to a ground truth pixel color value. For example, the ground truth image is a true, unmodified frame of the input video. In certain embodiments, the scene modeling system 110, during a training phase, updates one or more parameters of the scene representation model 119 based on the volume rendering loss 209. For example, one or more parameters of the deformation model 210 and/or the color model 215 are changed to minimize the volume rendering loss 209. In some embodiments, the model training subsystem 116 trains, during the training phase, the deformation model 210 along with the color model 215.

Figure 3:
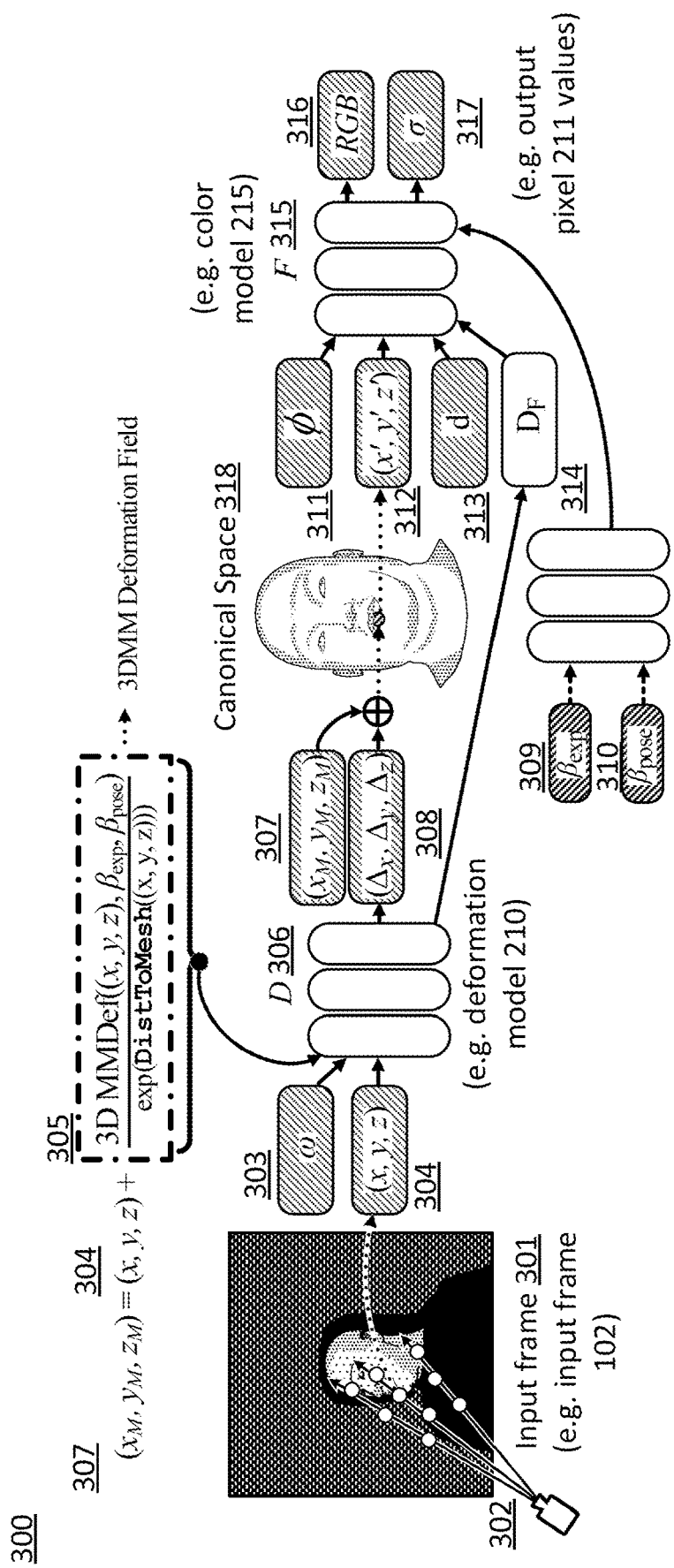
FIG. 3 depicts an illustration of the scene representation model of FIG. 2, according to certain embodiments disclosed herein.

FIG. 3 depicts an illustration of the scene representation model of FIG. 2, according to certain embodiments disclosed herein, in accordance with certain embodiments. As shown in FIG. 3, the model 300 (e.g. scene representation model 119) is a deformable NeRF architecture that includes two learnable MLPs, a deformation MLP D 306 (e.g. deformation model 210) and a color MLP F 315 (e.g. color model 215). Given an input frame 301 (e.g. input frame 102 of a video 103, as shown in FIG. 2), the scene representation model 119 marches rays 302 through each of the pixels of the input frame 301. For every ray marched through a respective input pixel 201, the deformation MLP 306 deforms each point on it in a canonical space 318 according to a 3DMM-guided deformation field 319. The deformation field 319 is a sum of the 3DMM deformation field 307 and a residual 308 predicted by the deformation MLP 306. The deformation MLP 306 predicts the deformation field 305 and residual 308 based on a deformation embedding 303, the position 304 of the point along the ray, as well as a value 305 of the deformation field 307 at the point. Next, the deformation point 312 (e.g. deformation point 202) is provided as input to the color MLP 315, which additionally takes as input the pose and expression parameters 310, 309, the viewing direction 313, and an appearance embedding 311 to predict a color 316 and a density 317 for a deformation point 202. In certain embodiments, the color MLP 315 also takes, as input, features 314 extracted from a penultimate level of the deformation MLP 306. A color 316 value and density 317 value of the deformation point 202 is calculated by the color MLP 315. In certain examples, a respective final color value for the pixel is determined based at least in part of the color 316 and density 317 values of the deformation point 202. The pixels, defined by their determined color values, form a view of an editable 3D scene 104 based on the input frame 102 of the video 103.

Figure 4:
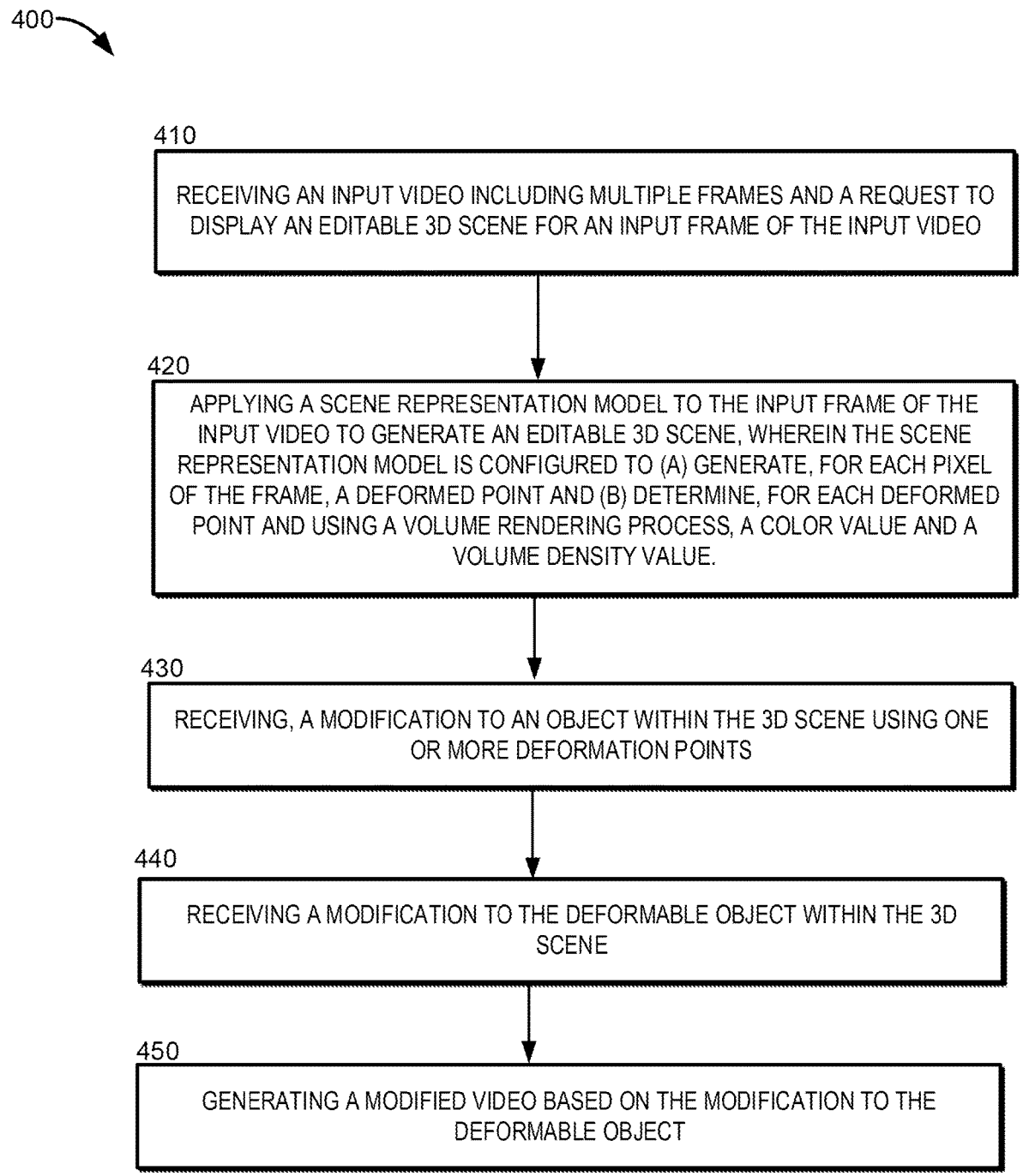
FIG. 4 depicts a method for generating, based on an input video and using the scene representation model of FIG. 2, an editable three-dimensional (3D) scene, according to certain embodiments disclosed herein.

Examples of Computer-Implemented Operations for Generating, Based on an Input Video, a 3D Editable Scene FIG. 4 depicts an example of a process for generating, based on an input video 103 and using the scene representation model 119 of FIG. 2, an editable 3D scene 104, according to certain embodiments disclosed herein. One or more computing devices (e.g., the scene modeling system 110 or the individual subsystems contained therein) implement operations depicted in FIG. 4. For illustrative purposes, the process 400 is described with reference to certain examples depicted in the figures. Other implementations, however, are possible.

At block 410, the method 400 involves receiving an input video 103 that includes multiple frames and a request to display an editable 3D scene 104 for a particular frame (an input frame 102) of the input video 103. The multiple frames of the input video 103 correspond to multiple views of an object. In certain examples, the input frame 102 is a frame of the input video 103 selected by the user. In certain examples, the input frame 102 is a predefined frame, for example, a first frame of the video, a center frame of the video, or other predetermined frame. The user may request to display the editable 3D scene 104 corresponding to the input frame 102 so that the user can edit the particular frame of the video 103 and generate a modified video 106 including the edited input frame 102. In an embodiment, the user computing device 120 transmits the input video 103 via the network 130. In certain embodiments, the scene representation subsystem 114 receives the input video 103. For example, the user captures, via a camera device of the user computing device 120, or otherwise selects from a data storage unit 125 of the user computing device 120, the input video 103. In certain embodiments, the user interacts with a scene modeling application 121 to capture the input video 103 and/or otherwise select stored input video 103. The scene modeling application 121 (or web browser application) is configured to transmit, to the scene modeling system 110, a request to provide an editable 3D scene 104 corresponding to the particular input frame 102, responsive to receiving inputs from the user, and to display the editable 3D scene 104 generated by the scene modeling system 110. In some instances, individual input video 103 frames include images of an object from various locations and/or camera angles. In some instances, the scene representation subsystem 114 further receives, along with or subsequently to receiving the input video 103, a view coordinate defining a requested view (e.g. camera position and camera view angle) for display of the editable 3D scene 104.

At block 420, the method 400 involves applying a scene representation model 119 to the input frame 102 to generate an editable 3D scene 104, wherein the scene representation model 119 is configured to (a) generate, for each pixel of the input frame, a deformation point and (b) determine, for each deformation point and using a volume rendering process, a color value and a volume density value. In some embodiments, the method 400 involves applying the scene representation model 119 described in FIG. 2 to the input frame 102 of the input video 103 to generate the editable 3D scene 104. In some instances, the scene representation model 119 generates an editable 3D scene 104 oriented according to a requested view 104 defined in the request for the editable 3D scene. In other instances, the scene representation model 119 generates an editable 3D scene 104 oriented according to a predefined view coordinate. In certain embodiments, applying the scene representation model 119 includes, for each pixel of the input frame 102, applying a deformation model 210, as described in FIG. 2 herein to generate a deformation point 210 and applying a color model 215, as also described in FIG. 2 herein to determine a color and volume density for the deformation point. FIG. 3 also provides details about applying the scene representation model 119. In certain embodiments, the editable 3D scene 104 includes a deformable object 105 (e.g. a face of the person depicted) which can be edited using deformation points 202 generated for the editable 3D scene 104. For example, edits include changing an expression of the deformable object 105 (e.g. changing a happy expression to a sad expression, opening a mouth) and/or changing a pose of the deformable object 105 (e.g. tilting the head).

At block 430, the method 400 involves transmitting, by the scene modeling system 110 and responsive to the request, the editable 3D scene 104. For example, the scene representation subsystem 114 transmits the editable 3D scene 104 to the system from which the request to generate the editable 3D scene 104 was received (e.g. the user computing device 120). In some embodiments, the scene representation subsystem 114 stores the editable 3D scene 104 in the data store 111, which is accessible to the user computing device 120, and the user computing device 120 accesses the editable 3D scene 104 via the network 130.

At block 440, the method 400 involves receiving, by the user computing device 120, a modification to a deformable object 105 within the editable 3D scene 104. In some embodiments, the user computing device 120 to which the editable 3D scene 104 is transmitted, modifies features of an online computing environment based on the editable 3D scene 104 generated by the scene representation model 119 for the input images 102. In some instances, modifying the features of the online computing environment includes presenting, in a user interface 123 (e.g. via a scene modeling application 121 hosted by the user computing device 120) the editable 3D scene 104, which includes the deformable object 105. For example, the deformable object 105 is the face of the person depicted within the editable 3D scene 104. In certain examples, the user computing device 120 displays the editable 3D scene 104 including the deformable object 105 via the user interface 123. The user interface 123 may include one or more user interface objects which the user can actuate to change a pose of the deformable object 105, change an expression of the deformable object 105, and/or change a view (e.g. camera position and/or camera view angle) of the editable 3D scene 104 corresponding to the input frame 102.

In certain examples, the user interface 123 displays a user interface object 123 that the user can select among frames of the video and request an editable 3D scene 103 for a selected input frame 102. In these examples, responsive to receiving a selection of this interface object the scene representation subsystem 114 applies the scene representation model 119 of FIG. 2 to the different input frame 102 to generate the different editable 3D scene 103 and displays the different editable 3D scene 103 via the user interface 123. In certain embodiments, to change a pose and/or an expression of the deformable object 105 and one or more user interface objects that enable modification to a facial expression. For example, the user may select a semantic category (e.g. surprised, angry, happy, afraid, amused, etc.) for the facial expression parameter 204 and the scene representation subsystem 114 and/or the scene modeling application 121 deforms the deformable object 105 using one or more deformation points of the deformation field generated by the scene representation model 119 to correspond to the updated expression parameter 204 selected by the user. Deforming the deformable object 105 involves deforming a 3D mesh model. For example, the deformable object 105 can be a face, the 3D mesh models the face, and the deformation points act as control points to deform the 3D mesh. In some instances, the user may select values across one or more dimensions (e.g. afraid to content, angry to happy, tired to energetic, etc.) to define a facial expression and the scene representation subsystem 114 and/or the scene modeling application 121 deforms the deformable object 105 using one or more deformation points of the deformation field generated by the scene representation model 119 to correspond to an expression parameter 204 specified by the user via the user interface 123 inputs. In certain embodiments, the expression parameter 204 is a set of parameters (e.g. a vector) in a 3D morphable model formulation. The set of parameters is interpretable and in some instances particular sets of parameters are associated with particular semantic labels.

Figure 7:
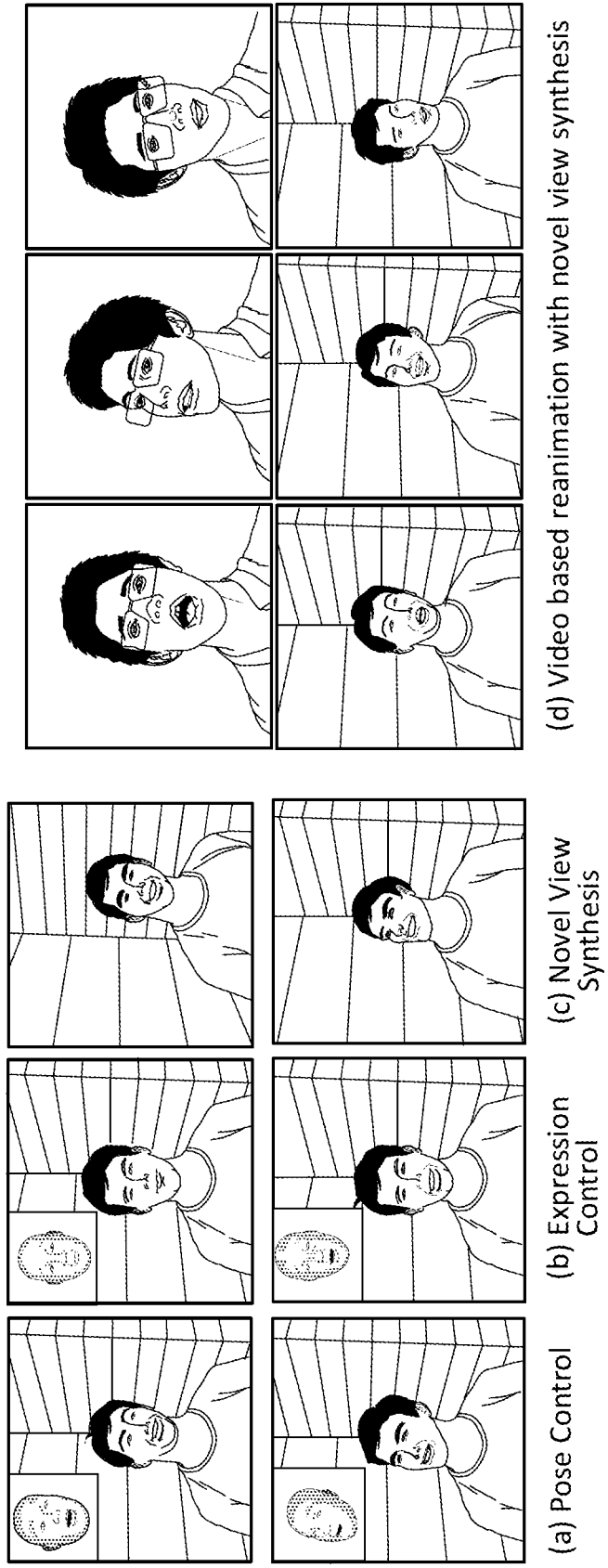
FIG. 7 depicts an illustration of an illustration of example of modified facial poses generated using the method of FIG. 4 and the scene representation model of FIG. 2, according to certain embodiments disclosed herein.

In certain examples, the user captures and/or selects an input image via the user computing device 120 that defines a target facial expression and/or facial pose and the scene modeling application 121 modifies the editable 3D scene 104 so that the expression and/or the facial pose of the deformable object 105 corresponding to the target facial expression and/or the target facial pose. An illustration of modifying a pose and/or a facial expression using input images is depicted in FIG. 7. For example, the user provides an input image corresponding to a desired facial expression (e.g. the deformed object 105 currently has an expression with a closed mouth and eyebrows lowered and the input image includes a face with an open mouth and eyebrows raised) and the deformation model 210 determines an expression parameter 204 for the input image and modifies the expression parameter 204 to correspond to the expression parameter 204 determined for the input image 204, which changes the expression of the deformable object 105 in the editable 3D scene 104 to correspond with the expression in the input image. For example, the user provides an input image corresponding to a desired pose (e.g. the deformed object 105 currently has a facial pose of the face which is centered, looking straight at the viewer and the target pose in the input image is of a face looking leftward thirty degrees and upward ten degrees from center) and the deformation model 210 determines a pose parameter 203 for the input image and modifies the pose parameter 203 to correspond to the expression parameter 204 determined for the input image 204, which changes the expression of the deformable object 105 in the editable 3D scene 104 to correspond with the pose in the input image.

In certain examples, in addition to and/or instead of editing a facial pose and/or a facial expression, the user edits a view of the editable 3D scene. For example, the view is defined by view coordinates indicating a camera location with the editable 3D scene and a camera view angle. To edit the camera location and/or camera view angle, the user may define the camera location and camera view angle by entering values into one or more fields (e.g. the user enters x, y, z axis locations for the camera and additional coordinates for the viewing angle of the camera. In another example, the user may define and/or change a view in the editable 3D scene 104 via a live scene view by moving a virtual camera and/or changing a view angle of the virtual camera within the initial view of the editable 3D scene 104 to change it to a subsequent view. In these examples, the scene modeling application 121 generates a subsequent output image defining the subsequent view 104 of the editable 3D scene 104. For example, the scene modeling application 121, for each requested subsequent view 104 of the 3D scene 103, the color model 215 renders, according to an updated viewing direction 205, a subsequent output image defining the subsequent view of editable 3D scene 104 based on the volume rendering process.

At block 450, the method 400 involves generating, by the user computing device, a modified video 106 based on the modification to the deformable object 105. For example, the scene modeling application 121 changes one or more of the pose of the deformable object 105, the expression of the deformable object 105, or the view within the 3D editable scene 104 and updates the editable 3D scene in accordance with the change. The scene modeling application 121 can generate the modified video 106 by replacing the input frame 102 with a new frame corresponding to the modified editable 3D scene (with the requested pose/expression and/or view change). In some instances, the scene modeling application 121 transmits the modified video 106 to the scene representation subsystem 114, which stores the modified video 106 in the data store 111, which is accessible to the user computing device 120, and the user computing device 120 accesses the modified video 106 via the network 130. In some embodiments, the scene modeling application 121 modifies features of an online computing environment based on the modified video 106 generated by the scene representation model 119 based on the modified editable 3D scene 104 (corresponding to the input frame 102). In some instances, modifying the features of the online computing environment include presenting, in a user interface 123 (e.g. via the scene modeling application 121) the modified video 106 and/or the replacement frame which replaces the input frame 102. In certain examples, the user computing device 120 displays the modified video 106 including the replacement frame via the user interface 123.

In certain embodiments, the scene modeling application 121 performs blocks 440, 450, and 460, as described herein. However, in other embodiments, the scene modeling subsystem 114 performs one or more steps described in blocks 440, 450, and 460. For example, in some instances, the scene modeling subsystem 114 receives, from the user computing device 120 via the network 130, one or more modifications to the deformable object 105 input by the user using the user computing device 120, renders an updated editable 3D scene 104 to edit the deformable object 105 within the 3D scene 104 in accordance with the one or more modifications, generates the modified video 106 based on the modified 3D scene 104, and transmits the modified video 106 to the user computing device 120 via the network 130. In this example, generating the modified video 106 includes at least generating an updated frame to replace the particular frame, the updated frame generated based on the updated editable 3D scene FIG. 5 depicts an illustration 500 of a deformation field for use in the scene representation model of FIG. 2, according to certain embodiments disclosed herein. As depicted in FIG. 5, a 3DMM deformation field, at any point in space, x, is equal to a deformation of its closest neighbor on the mesh x̂, weighted by an inverse of an exponential of a distance between x and x̂. The canonical mesh depicts a neutral face expression (e.g. expression including a closed mouth) and a neutral facial pose (e.g. facing forward) and the articulated mesh represents a change to the neutral face expression (e.g. face pose is tilted downward and to the right, facial expression is different and includes an open mouth).

FIG. 6 depicts an illustration 600 of example deformation fields output by the scene representation model of FIG. 2. FIG. 6 depicts a depth, a magnitude of an output of a deformation MLP D (deformation model 210), and a magnitude of D̂ (a sum of the 3DMM Deformation and D). In depth view (b), FIG. 6 shows how that despite large changes in head-pose, the depth remains consistent. As depicted in FIG. 6, renders of both an output of a deformation MLP (e.g. deformation model 210) and a 3DMM-guided deformation field D̂, as described previously in equation (3). FIG. 6 also depicts a depth-view (c), which shows that the MLP D generates an accurate deformation around the glasses of the person depicted, which the 3DMM deformation cannot do, for both head-poses (represented in the two separate rows). Further, FIG. 6 depicts a depth-view (d) where D̂ is only concentrated on the head of the person depicted.

FIG. 7 depicts an illustration 700 of examples of modified facial poses and expressions generated using the method of FIG. 4 and the scene representation model of FIG. 2, according to certain embodiments disclosed herein. FIG. 7 depicts how the embodiments described herein enable full control of head pose and facial expression of an object depicted in a video using a 3DMM-guided deformable NeRF. The scene representation model 119 described herein enables, separately or simultaneously, (a) head pose modification, (b) facial expression modification, and (c) viewpoint modification (e.g. camera position and/or orientation) of the editable 3D scene 103. Further, the scene representation model 119 described herein can be used to transfer facial animation from a driving video sequence to the editable 3D scene 103. For example, frames of the video sequence are used as input images to define a target expression, pose, and/or viewpoint and the scene representation model 119 modifies the expression and/or pose of the deformable object 105 within the editable 3D scene 104 to correspond to the target expression, the target pose, and/or the target viewpoint.

Examples of Computing Environments for Implementing Certain Embodiments

Figure 8:
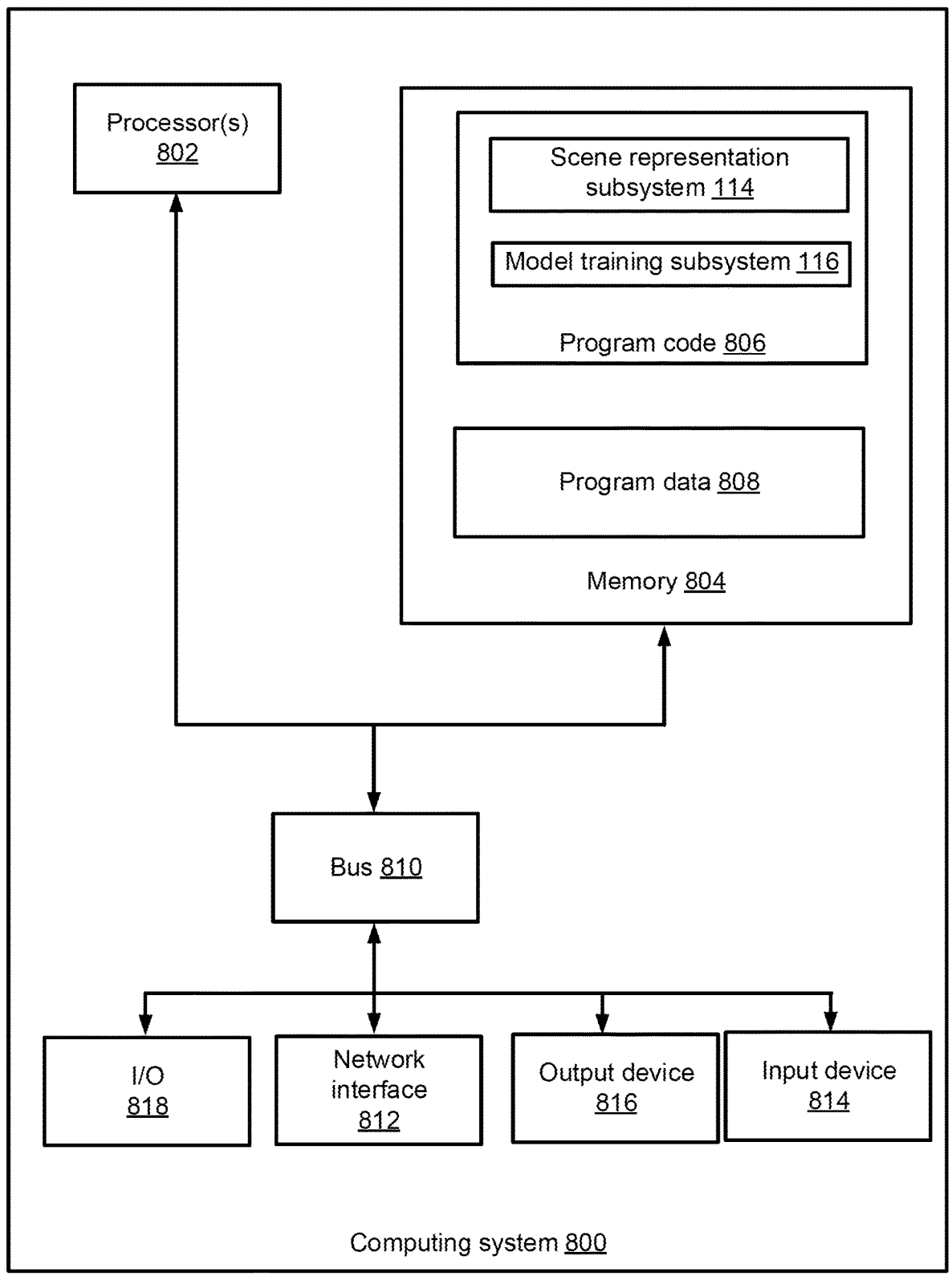
FIG. 8 depicts an example of a computing system that performs certain operations described herein, according to certain embodiments described in the present disclosure.

Any suitable computer system or group of computer systems can be used for performing the operations described herein. For example, FIG. 8 depicts an example of a computer system 800. The depicted example of the computer system 800 includes a processing device 802 communicatively coupled to one or more memory components 804. The processing device 802 executes computer-executable program code stored in a memory components 804, accesses information stored in the memory component 804, or both. Execution of the computer-executable program code causes the processing device to perform the operations described herein. Examples of the processing device 802 include a microprocessor, an application-specific integrated circuit ("ASIC"), a field-programmable gate array ("FPGA"), or any other suitable processing device. The processing device 802 can include any number of processing devices, including a single processing device.

The memory components 804 includes any suitable non-transitory computer-readable medium for storing program code 806, program data 808, or both. A computer-readable medium can include any electronic, optical, magnetic, or other storage device capable of providing a processing device with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory components 404 can be volatile memory, non-volatile memory, or a combination thereof.

The computer system 800 executes program code 906 that configures the processing device 902 to perform one or more of the operations described herein. Examples of the program code 906 include, in various embodiments, the scene modeling system 110 (including the scene representation subsystem 114 and the model training subsystem 116 described herein) of FIG. 1, which may include any other suitable systems or subsystems that perform one or more operations described herein (e.g., one or more neural networks, encoders, attention propagation subsystem and segmentation subsystem). The program code 806 may be resident in the memory components 904 or any suitable computer-readable medium and may be executed by the processing device 902 or any other suitable processor.

The processing device 802 is an integrated circuit device that can execute the program code 806. The program code 806 can be for executing an operating system, an application system or subsystem, or both. When executed by the processing device 802, the instructions cause the processing device 802 to perform operations of the program code 806. When being executed by the processing device 802, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory components 804 store the program data 708 that includes one or more datasets described herein. In some embodiments, one or more of data sets are stored in the same memory component (e.g., one of the memory components 804). In additional or alternative embodiments, one or more of the programs, data sets, models, and functions described herein are stored in different memory components 804 accessible via a data network. One or more buses 810 are also included in the computer system 800. The buses 810 communicatively couple one or more components of a respective one of the computer system 800.

In some embodiments, the computer system 800 also includes a network interface device 812. The network interface device 812 includes any device or group of devices suitable for establishing a wired or wireless data connection to one or more data networks. Non-limiting examples of the network interface device 812 include an Ethernet network adapter, a modem, and/or the like. The computer system 800 is able to communicate with one or more other computing devices via a data network using the network interface device 812.

The computer system 800 may also include a number of external or internal devices, an input device 814, a presentation device 816, or other input or output devices. For example, the computer system 800 is shown with one or more input/output ("I/O") interfaces 818. An I/O interface 818 can receive input from input devices or provide output to output devices. An input device 814 can include any device or group of devices suitable for receiving visual, auditory, or other suitable input that controls or affects the operations of the processing device 802. Non-limiting examples of the input device 814 include a touchscreen, a mouse, a keyboard, a microphone, a separate mobile computing device, etc. A presentation device 816 can include any device or group of devices suitable for providing visual, auditory, or other suitable sensory output. Non-limiting examples of the presentation device 816 include a touchscreen, a monitor, a speaker, a separate mobile computing device, etc.

Although FIG. 8 depicts the input device 814 and the presentation device 816 as being local to the computer system 800, other implementations are possible. For instance, in some embodiments, one or more of the input device 814 and the presentation device 816 can include a remote client-computing device that communicates with computing system 800 via the network interface device 812 using one or more data networks described herein.

Embodiments may comprise a computer program that embodies the functions described and illustrated herein, wherein the computer program is implemented in a computer system that comprises instructions stored in a machine-readable medium and a processing device that executes the instructions to perform applicable operations. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 9:
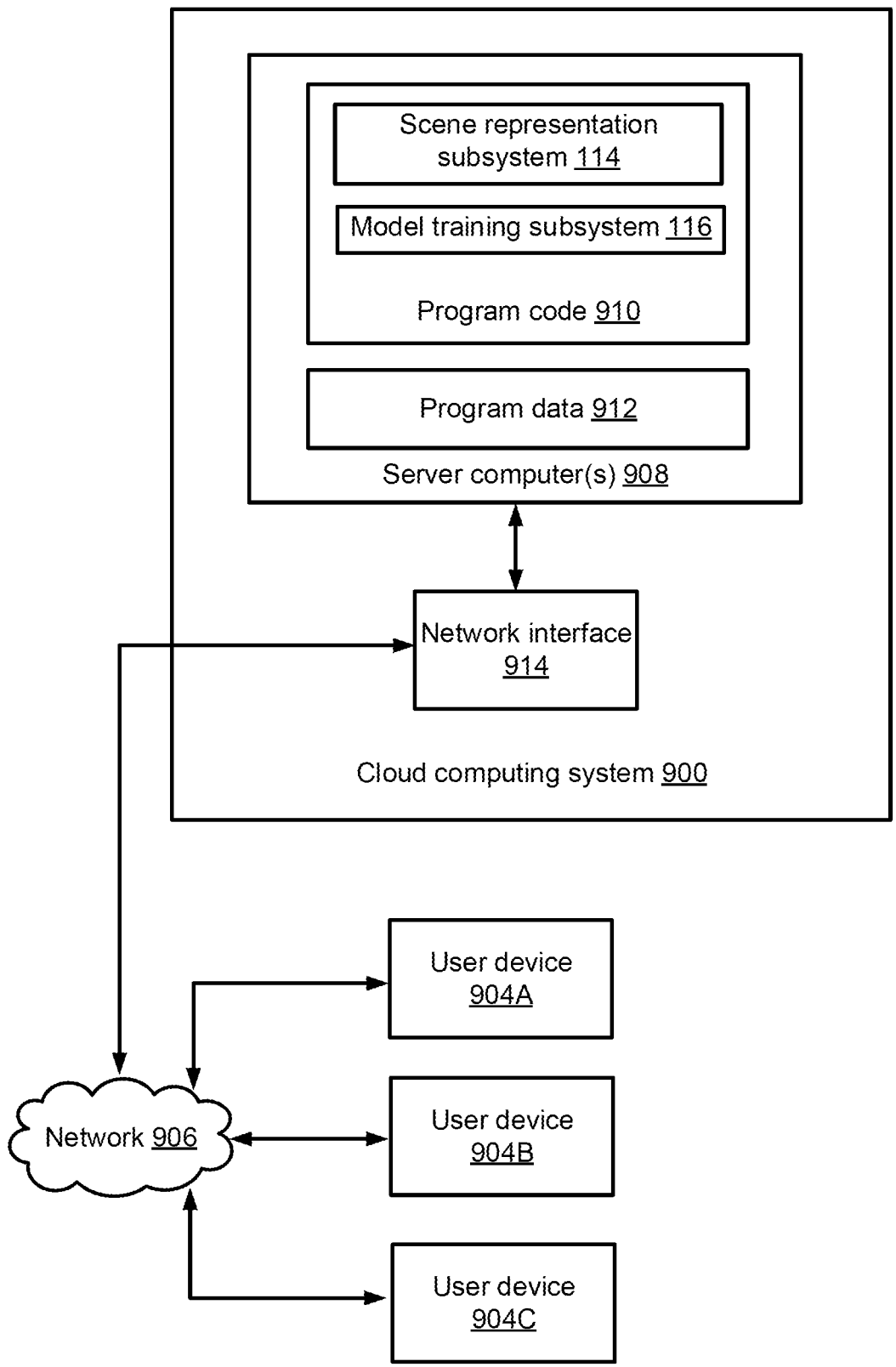
FIG. 9 an example of a cloud computing system that performs certain operations described herein, according to certain embodiments described in the present disclosure.

In some embodiments, the functionality provided by computer system 800 may be offered as cloud services by a cloud service provider. For example, FIG. 9 depicts an example of a cloud computer system 900 offering a service for providing an editable 3D scene 104 based on an input frame 102 of a video 103, that can be used by a number of user subscribers using user devices 904A, 904B, and 904C across a data network 906. In the example, the service for providing an editable 3D scene 104 based on an input frame 102 of a video 103 may be offered under a Software as a Service (SaaS) model. One or more users may subscribe to the service for providing an editable 3D scene 104 based on an input frame 102 of a video 103, and the cloud computer system 900 performs the processing to provide the service for providing an editable 3D scene 104 based on an input frame 102 of a video 103. The cloud computer system 900 may include one or more remote server computers 908.

The remote server computers 908 include any suitable non-transitory computer-readable medium for storing program code 910 (e.g., the scene representation subsystem 114 and the model training subsystem 116 of FIG. 1) and program data 912, or both, which is used by the cloud computer system 900 for providing the cloud services. A computer-readable medium can include any electronic, optical, magnetic, or other storage device capable of providing a processing device with executable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 1008 can include volatile memory, non-volatile memory, or a combination thereof.

One or more of the server computers 908 execute the program code 910 that configures one or more processing devices of the server computers 908 to perform one or more of the operations that provide an editable 3D scene 104 based on an input frame 102 of a video 103. As depicted in the embodiment in FIG. 9, the one or more servers providing the services for providing an editable 3D scene 104 based on an input frame 102 of a video 103 may implement the scene representation subsystem 114 and the model training subsystem 116. Any other suitable systems or subsystems that perform one or more operations described herein (e.g., one or more development systems for configuring an interactive user interface) can also be implemented by the cloud computer system 900.

In certain embodiments, the cloud computer system 900 may implement the services by executing program code and/or using program data 912, which may be resident in a memory component of the server computers 908 or any suitable computer-readable medium and may be executed by the processing devices of the server computers 908 or any other suitable processing device.

In some embodiments, the program data 912 includes one or more datasets and models described herein. In some embodiments, one or more of data sets, models, and functions are stored in the same memory component. In additional or alternative embodiments, one or more of the programs, data sets, models, and functions described herein are stored in different memory components accessible via the data network 906.

The cloud computer system 900 also includes a network interface device 914 that enable communications to and from cloud computer system 900. In certain embodiments, the network interface device 914 includes any device or group of devices suitable for establishing a wired or wireless data connection to the data networks 906. Non-limiting examples of the network interface device 914 include an Ethernet network adapter, a modem, and/or the like. The service for providing an editable 3D scene 104 based on an input frame 102 of a video 103 is able to communicate with the user devices 904A, 904B, and 904C via the data network 906 using the network interface device 914.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method, comprising:
   receiving, at a scene modeling system, a video including a plurality of frames corresponding to a plurality of views of an object and a request to display an editable three-dimensional (3D) scene that includes the object and that corresponds to a particular frame of the plurality of frames;
   generating, by the scene modeling system, the editable 3D scene by applying a scene representation model to the particular frame, wherein the scene representation model comprises:
   a deformation model configured to generate a 3D morphable model ("3DMM") guided deformation field based on a 3DMM deformation field and a residual predicted by the deformation model, and further generate, for each pixel of the particular frame and based on a pose and an expression of the object, a deformation point using the 3DMM guided deformation field, and
   a color model configured to determine, for the deformation point and using a volume rendering process, a color value and a volume density value; and
   providing, by the scene modeling system, the editable 3D scene to a computing device executing a scene modeling application configured to generate a modified video using the editable 3D scene, wherein the scene modeling application generates the modified video by:

receiving a modification to one or more of the pose or the expression of the object including at least a modification to a location of the deformation point, receiving a modification to a view of the editable 3D scene, wherein the modification to the view comprises one or more of a change to a camera position or to a camera orientation within the editable 3D scene, rendering an updated editable 3D scene based on the received modification to the one or more of the pose or the expression of the object and by changing the view of the editable 3D scene to the modified view, and generating the modified video including an updated frame to replace the particular frame, the updated frame generated based on the updated editable 3D scene.

2. The method of claim 1, wherein the edit to the object comprises a change to one or more of the pose or the expression.

3. The method of claim 1, wherein the pose of the object represents an orientation of the object with respect to a default pose and wherein the edit to the pose of the object corresponds a change in the orientation of the object.

4. The method of claim 1, wherein the expression of the object corresponds to a first semantic category and wherein the edit to the expression of the object comprises a selection of a second semantic category.

5. The method of claim 1, wherein the pose and the expression are extracted from the particular frame using a detailed expression capture and animation ("DECA") method.

6. The method of claim 1, wherein deforming the point using the 3DMM guided deformation field comprises transforming the point to a canonical space, wherein the color model is applied to the transformed point.

7. The method of claim 1, wherein each of the deformation model and the color model comprise a multilayer perceptron model, wherein the deformation model is configured to generate the 3DMM guided deformation field, residual, and deformation points in a first stage, and the color model is configured to determine, in a second stage, a color value and volume density value based on the deformation point generated in the first stage, and further based on the pose and expression of the object.

8. A system, comprising:
a memory component; and
a processing device coupled to the memory component, the processing device to perform operations comprising:
generating, for a particular frame of a video, an editable 3D scene that includes an object that is depicted in the particular frame of the video by applying a scene representation model to the particular frame, wherein the video includes a plurality of frames corresponding to a plurality of views of an object including the particular frame, wherein the scene representation model comprises:
a deformation model configured to generate a 3D morphable model ("3DMM") guided deformation field based on a 3DMM deformation field, and a residual predicted by the deformation model, and further generate, for each pixel of the particular frame and based on a pose and an expression of the object, a deformation point using the 3DMM guided deformation field, and a color model configured to determine, for the deformation point and using a volume rendering process, a color value and a volume density value; and providing the editable 3D scene to a computing device executing a scene modeling application configured to generate a modified video using the editable 3D scene, wherein the scene modeling application generates the modified video by:
receiving a modification to one or more of the pose or the expression of the object including at least a modification to a location of the deformation point, receiving a modification to a view of the editable 3D scene, wherein the modification to the view comprises one or more of a change to a camera position or to a camera orientation within the editable 3D scene, rendering an updated editable 3D scene based on the received modification to the one or more of the pose or the expression of the object and by changing the view of the editable 3D scene to the modified view, and generating a modified video including an updated frame to replace the particular frame, the updated frame generated based on the updated editable 3D scene.

9. The system of claim 8, wherein the edit to the object comprises a change to one or more of the pose or the expression.

10. The system of claim 8, wherein the pose of the object represents an orientation of the object with respect to a default pose and wherein the edit to the pose of the object corresponds a change in the orientation of the object.

11. The system of claim 8, wherein the expression of the object corresponds to a first semantic category and wherein the edit to the expression of the object comprises a selection of a second semantic category.

12. The system of claim 8, wherein deforming the point using the 3DMM guided deformation field comprises transforming the point to a canonical space, wherein the color model is applied to the transformed point.

13. The system of claim 8, wherein each of the deformation model and the color model comprise a multilayer perceptron model, wherein the deformation model is configured to generate the 3DMM guided deformation field, residual, and deformation points in a first stage, and the color model is configured to determine, in a second stage, a color value and volume density value based on the deformation point generated in the first stage, and further based on the pose and expression of the object.

14. A non-transitory computer-readable medium storing executable instructions, which when executed by a processing device, cause the processing device to perform operations comprising:
generating, for a particular frame of a video, an editable 3D scene that includes an object that is depicted in the particular frame of the video by applying a scene representation model to the particular frame, wherein the video includes a plurality of frames corresponding to a plurality of views of an object including the particular frame, wherein the scene representation model comprises:
a deformation model configured to generate a 3D morphable model ("3DMM") guided deformation field based on a 3DMM deformation field, and a residual predicted by the deformation model, and further generate, for each pixel of the particular frame and based on a pose and an expression of the object, a deformation point using the 3DMM guided deformation field, and a color model configured to determine, for the deformation point and using a volume rendering process, a color value and a volume density value;

receiving a modification to one or more of the pose or the expression of the object including at least a change in location of the deformation point;

receiving a modification to a view of the editable 3D scene, wherein the modification to the view comprises one or more of a change to a camera position or to a camera orientation within the editable 3D scene;

rendering an updated editable 3D scene based on the received modification to the one or more of the pose or the expression of the object and by changing the view of the editable 3D scene to the modified view; and generating a modified video including an updated frame to replace the particular frame, the updated frame generated based on the updated editable 3D scene.

15. The non-transitory computer-readable medium of claim 14, wherein the edit to the object comprises a change to one or more of the pose or the expression.

16. The non-transitory computer-readable medium of claim 14, wherein deforming the point using the 3DMM guided deformation field comprises transforming the point to a canonical space, wherein the color model is applied to the transformed point.

17. The non-transitory computer-readable medium of claim 14, wherein each of the deformation model and the color model comprise a multilayer perceptron model, wherein the deformation model is configured to generate the 3DMM guided deformation field, residual, and deformation points in a first stage, and the color model is configured to determine, in a second stage, a color value and volume density value based on the deformation point generated in the first stage, and further based on the pose and expression of the object.

* * * * *